April 9, 1940.    R. DAUB    2,196,252
TWO CYCLE ENGINE
Filed Aug. 25, 1938
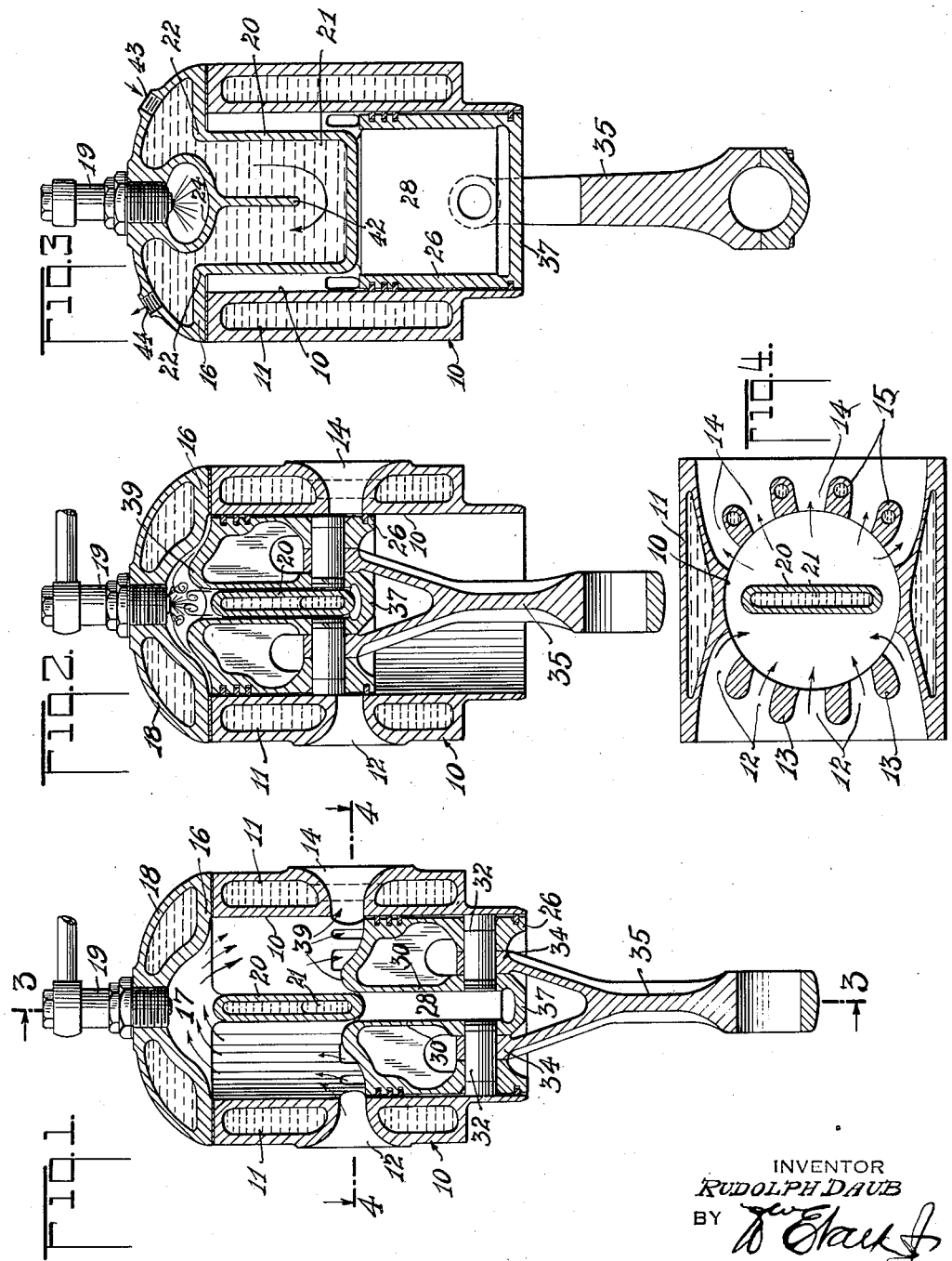
INVENTOR
RUDOLPH DAUB
BY
ATTORNEY Patented Apr. 9, 1940

2,196,252

UNITED STATES PATENT OFFICE 2,196,252

TWO-CYCLE ENGINE

Rudolph Daub, Paterson, N. J., assignor to Wright Aeronautical Corporation, a corporation of New York Application August 25, 1938, Serial No. 226,627

11 Claims. (Cl. 123—65)

This invention relates to two-cycle internal combustion engines, and is particularly concerned with improvements to provide for better scavenging and better combustion than may be obtained with conventional structures.

The provisions of the invention are adapted for use with compression-ignition engines or with those adapted to utilize electric ignition, a particular object of the invention being to provide structure which defines a definite path of gas flow in an engine cylinder during engine operation. A further object is to provide an arrangement whereby a greatly improved shape of combustion chamber is accomplished. Further objects comprise the provision of structural devices by which improved engine performance may result, in connection with which reference may be made to the detailed description below, and the drawing, in which:

Fig. 1 is a longitudinal section through an engine cylinder showing the piston thereof in the bottom dead center position;

Fig. 2 is a longitudinal section showing the piston on its top dead center position;

Fig. 3 is a section on the line 3—3 of Fig. 1, and Fig. 4 is a section on the line 4—4 of Fig. 1.

An engine cylinder 10 is provided with jackets 11 for the circulation of a cooling fluid and, toward the lower end of its effective volume is provided with a plurality of intake ports 12 defined by bridge elements 13, the several intake ports lying on one side of a diameter of the cylinder. Opposite the intake ports, exhaust ports 14 are formed, these being defined by cored bridge pieces 15 through the cores of which coolant fluid may flow. A cylinder head 16 is suitably attached to the top of the cylinder, the head being domed as at 17 to provide a combustion chamber, the head in addition having a coolant jacket 18 and a central fuel injection nozzle 19. The injection nozzle 19 may be replaced by a spark plug if the engine be of the electric ignition type. From the cylinder head 16 depends a substantially flat but hollow plate 20, the hollow thereof being indicated at 21, this plate being integral with the head and being joined thereto at the upper edges of the plate as at 22, the hollow 21 of the plate communicating freely with the jacket 18 of the cylinder head. Between the plate edge junctions 22 an opening 24 is defined which lies directly beneath the fuel injection nozzle 19, this hollow, in effect, forming a part of the combustion space 17.

A piston 26 is reciprocable in the cylinder and is provided with a central slot or well 28 of flattened form within which the plate 20 is adapted to nest when the piston is elevated above its bottom center position. The well 28 is defined by walls 30 integral with the piston, these walls, with the side walls of the piston forming bosses for a pair of piston pins 32 upon which the ends 34 of a forked connecting rod 35 are journaled. The use of the forked connecting rod and two piston pins allows of the placement of the piston pins above the bottom of the well 28, thereby reducing the overall length of the piston. The bottom of said well 28 is defined by a wall 37 so that the piston is sealed against the escape of gases by means of the effective piston head 39, the walls 30 and the well bottom 37. It is contemplated that there shall be a fairly loose fit between the sides of the plate 20 and the side walls of the slot 28, there being no metal-to-metal contact between these surfaces. In the operation of the system, intake air enters the ports 12 and must pass upwardly, through the opening 24 and downwardly on the opposite side of the plate 20 before it may leave through the exhaust ports 14. Thereby, during engine operation, the exhaust gases remaining in the cylinder must be completely scavenged by the incoming air after which the piston rises, sealing off the ports 12 and 14 and compressing the air charge in the cylinder proper. At the top of the piston stroke fuel is injected through the jet 19 into the combustion space 17, ignition of the fuel charge driving the piston downwardly until the ports 12—14 are uncovered. As is conventional in two-cycle engines, the exhaust ports are opened slightly before the intake ports on the down stroke of the piston, exhaust gas thereupon leaving through the ports 14 and shortly thereafter incoming air washes the exhaust gases thoroughly from within the cylinder. In conventional engines, a baffle rises from the piston head close to the intake ports whereby the incoming air is directed upwardly with the object of accomplishing fairly complete scavenging of exhaust gas from the cylinder. However, such baffles are only partly effective and in high speed engines there is a considerable amount of exhaust gas remaining in the cylinder after each cycle of operation which tends to reduce the power. With the arrangement of this invention, complete scavenging of exhaust gas is virtually assured and additionally, great turbulence of the fresh air charge is afforded upon the upstroke of the piston in the interest of more efficient combustion. The turbulent compressed gases which are confined to the combustion space 17 will readily effect an admixture of fuel with air when the fuel is admitted, and by the shape of the combustion chamber afforded by the provisions of the invention, rapid and complete combustion of the fuel charge is assured. It will be noted that the combustion chamber, when the piston is in its uppermost position, is greatly confined and is of more or less spherical shape whereby the distance from the fuel jet to the most remote part of the combustion chamber is small. There are no long channels or separated chambers which would have the tendency of slowing the combustion process and promoting detonation.

It is realized, of course, that the plate 20 is in the hottest part of the cylinder, and accordingly the plate is hollow, as previously described, by which it may be liquid cooled. To assure a favorable and positive path for the cooling liquid, a baffle 42, shown in Fig. 3, extends from the top of the plate part way toward the bottom thereof and within the plate hollow so that, if cooling fluid be admitted to the head 16 through an opening 43, such fluid will follow the path indicated by the curved arrow to leave the plate and head through an exit opening 44. This extra cooling area made available by the plate 20 consists in keeping the center of the piston cool due to heat flow from the piston head down the walls 30 and to the plate. Since the surface area of a piston increases as the square of the bore, and since the volume thereof increases as the cube of the bore, the provision of this extra cooling plate is particularly favorable in large bore engines as it provides extra cooling surface which would not otherwise be available. Thus, the provisions of the invention point to the possibility of increasing the bore and power of engines beyond their present range.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an internal combustion engine, in combination, a cylinder having a head, a baffle plate depending from the head having a through opening at the top, the width of said baffle being less than the cylinder bore, and a piston reciprocable in said cylinder having a slot therein within which said baffle slides when the piston is above bottom center, said baffle lying without said piston when the latter is at bottom center thereby dividing the cylinder into two compartments in communication with one another through said baffle opening and through the clearance space at the sides of said baffle.

2. In an internal combustion engine, in combination, a cylinder having a head, a baffle plate depending from the head having a through opening at the top, the width of said baffle being less than the cylinder bore, a piston reciprocable in said cylinder having a slot therein within which said baffle slides when the piston is above bottom center, said baffle lying without said piston when the latter is at bottom center thereby dividing the cylinder into two compartments in communication with one another through said baffle opening and through the clearance space at the sides of said baffle, said baffle having a hollow therein for cooling liquid, and inlet and outlet ducts in communication with said hollow.

3. In an internal combustion engine, in combination, a cylinder, a head therefor having a flat baffle extending downwardly therefrom dividing the cylinder into adjacent compartments of substantially semi-cylindrical shape, said baffle having an opening through the top part thereof establishing communication between said compartments.

4. In an internal combustion engine, in combination, a cylinder, a head therefor having a flat baffle extending downwardly therefrom dividing the cylinder into adjacent compartments of substantially semi-cylindrical shape, said baffle having an opening through the top part thereof establishing communication between said compartments, and a piston in the cylinder having a slot of such depth as to receive some part of the baffle throughout the full stroke of the piston.

5. In an internal combustion engine, in combination, a cylinder, a head therefor having a flat baffle extending downwardly therefrom dividing the cylinder into adjacent compartments of substantially semi-cylindrical shape, said baffle having an opening through the top part thereof establishing communication between said compartments, a piston in the cylinder having a slot of such depth as to receive some part of the baffle throughout the full stroke of the piston, and means for cooling said baffle.

6. In an internal combustion engine, in combination, a cylinder, a head therefor having a flat baffle extending downwardly therefrom dividing the cylinder into adjacent compartments of substantially semi-cylindrical shape, said baffle having an opening through the top part thereof establishing communication between said compartments, and a piston in the cylinder having a slot of such depth as to receive some part of the baffle throughout the full stroke of the piston, said cylinder head being domed adjacent said baffle opening to define a combustion space.

7. In an internal combustion engine, in combination, a cylinder, a head therefor having a flat baffle extending downwardly therefrom dividing the cylinder into adjacent compartments of substantially semi-cylindrical shape, said baffle having an opening through the top part thereof establishing communication between said compartments, and a piston in the cylinder having a slot of such depth as to receive some part of the baffle throughout the full stroke of the piston, said cylinder having inlet and exhaust ports therein respectively on opposite sides of said baffle, whereby fluid entering said inlet port must travel through the baffle opening prior to exit through the exhaust port.

8. In a two-cycle engine comprising a ported cylinder member and a piston member reciprocable therein to cover and uncover said ports, a flat baffle carried by one said member and separating certain of said ports from direct communication, said baffle having a through opening remote from said ports, said other member having a slot into which the baffle is slidable upon reciprocation of the piston in the cylinder.

9. In a two-cycle engine comprising a cylinder member having ports and a piston member reciprocable therein to cover and uncover said ports, a flat baffle carried by one said member and separating certain of said ports from direct communication, said baffle having a through opening remote from said ports, said other member having a slot into which the baffle is slidable upon reciprocation of the piston in the cylinder, coolant jackets embracing said cylinder, and means for introducing coolant to said baffle during engine operation.

10. An engine including a cylindrical piston having a flat axial slot extending across and downwardly from the piston head the walls of the slot and piston defining segmental hollows therebetween, a bifurcated connecting rod having portions extending into said hollows, and knuckle pins connecting each rod portion to respective slot and piston walls.

11. An engine including a cylindrical piston having an axial slot extending downwardly from the piston head, a bifurcated connecting rod having portions between the piston and slot walls, knuckle pins connecting each said rod portion to respective slot and piston walls, and a cylinder having a substantially flat plate depending therefrom adapted to enter the piston slot upon relative reciprocation of the piston in the cylinder.

RUDOLPH DAUB.